(12) United States Patent
Dasari et al.

(10) Patent No.: US 9,251,346 B2
(45) Date of Patent: Feb. 2, 2016

(54) PREVENTING PROPAGATION OF HARDWARE VIRUSES IN A COMPUTING SYSTEM

(71) Applicant: LENOVO ENTERPRISE SOLUTIONS (SINGAPORE) PTE. LTD., Singapore (SG)

(72) Inventors: Shiva R. Dasari, Austin, TX (US);
Sudhir Dhawan, Austin, TX (US);
Raghuswamyreddy Gundam, Austin, TX (US); Joshua H. Israel, Austin, TX (US); Karthik Kolavasi, Austin, TX (US); Newton P. Liu, Austin, TX (US);
Douglas W. Oliver, Round Rock, TX (US); Mehul M. Shah, Austin, TX (US);
Wingcheung Tam, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 148 days.

(21) Appl. No.: 13/778,372

(22) Filed: Feb. 27, 2013

(65) Prior Publication Data
US 2014/0245445 A1 Aug. 28, 2014

(51) Int. Cl.
*G06F 21/56* (2013.01)
*G06F 11/30* (2006.01)
*G06F 21/55* (2013.01)
*G06F 21/86* (2013.01)

(52) U.S. Cl.
CPC .......... *G06F 21/561* (2013.01); *G06F 11/3065* (2013.01); *G06F 21/55* (2013.01); *G06F 21/86* (2013.01)

(58) Field of Classification Search
None
See application file for complete search history.

(56) References Cited

U.S. PATENT DOCUMENTS

| 3,594,694 A | * | 7/1971 | Clark | 439/131 |
| 4,696,047 A | * | 9/1987 | Christian et al. | 382/146 |
| 4,927,692 A | * | 5/1990 | Dhanakoti et al. | 428/137 |
| 4,993,964 A | * | 2/1991 | Trummer | 439/272 |
| 5,043,931 A | * | 8/1991 | Kovach et al. | 702/108 |
| 5,051,100 A | * | 9/1991 | Kato et al. | 439/140 |
| 5,581,540 A | * | 12/1996 | Dang | 720/729 |
| 5,748,910 A | * | 5/1998 | Herrera E. | 710/300 |
| 6,061,903 A | * | 5/2000 | Lees et al. | 29/837 |

(Continued)

OTHER PUBLICATIONS

Disclosed Anonymously, "Method to Design A Greener and More Manageable Blade by Controlling The State Of Its Auxiliary Power Rails", IP.com Prior Art Database, IPCOM000218065D, May 17, 2012, pp. 1-4, USA.

(Continued)

*Primary Examiner* — Dede Zecher
*Assistant Examiner* — Richard McCoy
(74) *Attorney, Agent, or Firm* — Edward J. Lenart; Katherine S. Brown; Kennedy Lenart Spraggins LLP

(57) ABSTRACT

Preventing propagation of hardware viruses in a computing system, including: determining, by a hardware virus detection module, whether an empty connector in the computing system is damaged, wherein the empty connector is blocked from receiving an attachable computing device by a bumper; determining, by the hardware virus detection module, whether a connector for the attachable computing device is damaged; and responsive to determining that the empty connector is not damaged and that the connector for the attachable computing device is not damaged, moving the bumper such that the empty connector is not blocked from receiving the attachable computing device.

18 Claims, 5 Drawing Sheets

(56) References Cited

U.S. PATENT DOCUMENTS

| | | | |
|---|---|---|---|
| 6,457,071 B1 * | 9/2002 | Thorland et al. | 710/19 |
| 6,493,827 B1 * | 12/2002 | Mueller et al. | 713/300 |
| 6,747,424 B1 * | 6/2004 | Malik et al. | 318/400.23 |
| 6,826,113 B2 * | 11/2004 | Ellis et al. | 365/233.13 |
| 7,478,177 B2 | 1/2009 | Cherian et al. | |
| 7,480,774 B2 * | 1/2009 | Ellis et al. | 711/154 |
| 7,755,376 B2 * | 7/2010 | Ding | 324/750.07 |
| 7,791,217 B2 * | 9/2010 | Kamaga | 307/9.1 |
| 7,861,110 B2 | 12/2010 | Haley et al. | |
| 7,927,130 B2 * | 4/2011 | Fukuda | 439/488 |
| 7,990,105 B2 * | 8/2011 | Matsumoto et al. | 320/120 |
| 8,001,221 B2 | 8/2011 | Tameshige et al. | |
| 8,060,141 B2 * | 11/2011 | Lo et al. | 455/558 |
| 8,171,142 B2 | 5/2012 | Kolin et al. | |
| 8,201,266 B2 | 6/2012 | Campbell et al. | |
| 8,230,397 B2 * | 7/2012 | Farrell et al. | 717/124 |
| 8,425,243 B2 * | 4/2013 | Alvarez Rivera | 439/142 |
| 8,627,289 B2 * | 1/2014 | Farrell et al. | 717/124 |
| 8,655,856 B2 * | 2/2014 | Paknad et al. | 707/694 |
| 2003/0197607 A1 * | 10/2003 | Striemer | 340/539.1 |
| 2004/0152350 A1 * | 8/2004 | Mastoris et al. | 439/148 |
| 2004/0257998 A1 | 12/2004 | Chu et al. | |
| 2006/0014420 A1 * | 1/2006 | Lebo et al. | 439/507 |
| 2008/0222532 A1 | 9/2008 | Mester et al. | |
| 2008/0258704 A1 * | 10/2008 | Ryskoski et al. | 324/66 |
| 2008/0276121 A1 | 11/2008 | Probst et al. | |
| 2009/0090863 A1 * | 4/2009 | Watanabe et al. | 250/307 |
| 2010/0106987 A1 | 4/2010 | Lambert et al. | |
| 2012/0166786 A1 | 6/2012 | Selitser | |
| 2013/0212427 A1 * | 8/2013 | Franceschini et al. | 714/6.13 |
| 2014/0074872 A1 * | 3/2014 | Amin et al. | 707/758 |
| 2014/0245445 A1 * | 8/2014 | Dasari et al. | 726/24 |

OTHER PUBLICATIONS

IBM, "System to Improve Detection of BladeCenter Midplane Hardware Issues", IP.com Prior Art Database, IPCOM000140914D, Sep. 26, 2006, pp. 1-3, USA.

IBM TDB et al., "Bent Pin Detection Device", IP.com Prior Art Database, IPCOM000093493D, published electronically Mar. 6, 2005, pp. 1-3, USA.

Armand et al., "Detecting and Measuring Bent Pins on Electronic Components", spie.org (online), [accessed Sep. 12, 2012], Oct. 7, 2009, 2 pp., URL: http://spie.org/documents/Newsroom/Imported/1808/1808_6262_0_2009-09-22.pdf.

* cited by examiner

PREVENTING PROPAGATION OF HARDWARE VIRUSES IN A COMPUTING SYSTEM

BACKGROUND OF THE INVENTION

1. Field of the Invention

The field of the invention is data processing, or, more specifically, methods, apparatus, and products for preventing propagation of hardware viruses in a computing system.

2. Description of Related Art

Modern computing systems can take on a variety of form factors and can frequently be augmented by adding attached components. One example of such a computing system is a blade center that includes a plurality of blade servers. Such computing systems may be vulnerable to a hardware virus that causes hardware components of the computing system to be damaged. In the context of a blade center, a hardware virus can include a damaged connector on the midplane of the blade chassis such that any blade server that is plugged into that slot will become damaged. For example, a bent pin on the midplane connector can damage, or infect, the corresponding connector on any blade server that is being plugged in to the damaged connector. Likewise, any blade server that is infected with a hardware virus can damage the midplane connector when the damaged blade server is plugged in to the midplane connector. In such a way, the hardware virus can spread to other hardware components in the computing system.

SUMMARY OF THE INVENTION

Methods, apparatus, and products for preventing propagation of hardware viruses in a computing system, including: determining, by a hardware virus detection module, whether an empty connector in the computing system is damaged, wherein the empty connector is blocked from receiving an attachable computing device by a bumper; determining, by the hardware virus detection module, whether a connector for the attachable computing device is damaged; and responsive to determining that the empty connector is not damaged and that the connector for the attachable computing device is not damaged, moving the bumper such that the empty connector is not blocked from receiving the attachable computing device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
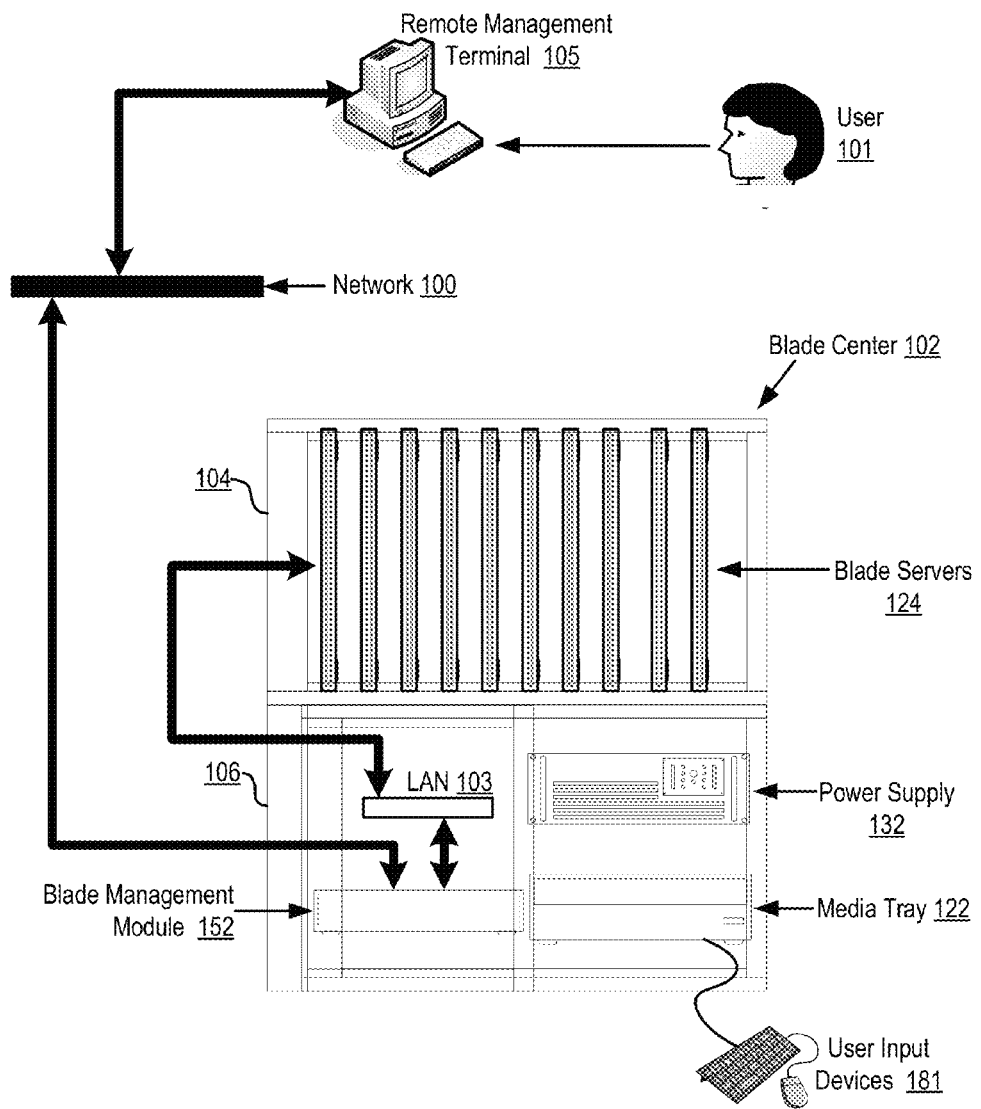
FIG. 1 sets forth a diagram of an example computing system capable of preventing propagation of hardware viruses according to embodiments of the present invention.

Example methods, apparatus, and products for preventing propagation of hardware viruses in a computing system in accordance with the present invention are described with reference to the accompanying drawings, beginning with FIG. 1. FIG. 1 sets forth a diagram of an example computing system capable of preventing propagation of hardware viruses according to embodiments of the present invention. The computing system of FIG. 1 includes a blade center (102) that is coupled for data communications through a network (100) to a remote management terminal (105) operated by a user (101) such as a system administrator. The blade center (102) of FIG. 1 is embodied as a two-bay chassis (104, 106) that includes a plurality of blade servers (124), one or more blade management modules (152), a media tray (122), and a blade server system power supply (132).

The blade management module (152) includes one or more software and hardware components and one or more computer processors and computer memory. The blade management module (152) provides system management functions for all components in the example blade center (102) including the blade servers (124) and the media tray (122). The blade servers (124), which are installed in the cabinet bay (104) of the exemplary blade center (102) in the example of FIG. 1, are several computing devices implemented in blade form factor. The blade servers share access to the media tray (122). The blade servers (124) are connected to one another and to the blade management module (152) for data communications through a local area network ('LAN') (103). The LAN (103) is a small network installed within the chassis of the blade center.

The media tray (122) houses non-volatile memory media and also makes available connections for user input devices such as mice or keyboards (181) that are not generally connected directly to the blade servers or to the blade center chassis. A media tray may typically include Compact Disc read-only media drives ('CD-ROM'), Digital Video Disc ROM drives (DVD-ROM), CD-RW drives, DVD-RW drives, floppy disk drives, and so on as will occur to those of skill in the art.

The arrangement of the blade center (192), the remote management terminal (105), the networks (100, 103), and other devices making up the exemplary system illustrated in FIG. 1 are for explanation, not for limitation. Data processing systems useful according to various embodiments of the present invention for preventing propagation of hardware viruses may include additional servers, routers, and other devices, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

Various embodiments of the present invention may be implemented on a variety of hardware platforms in addition to those illustrated in FIG. 1.

Figure 2:
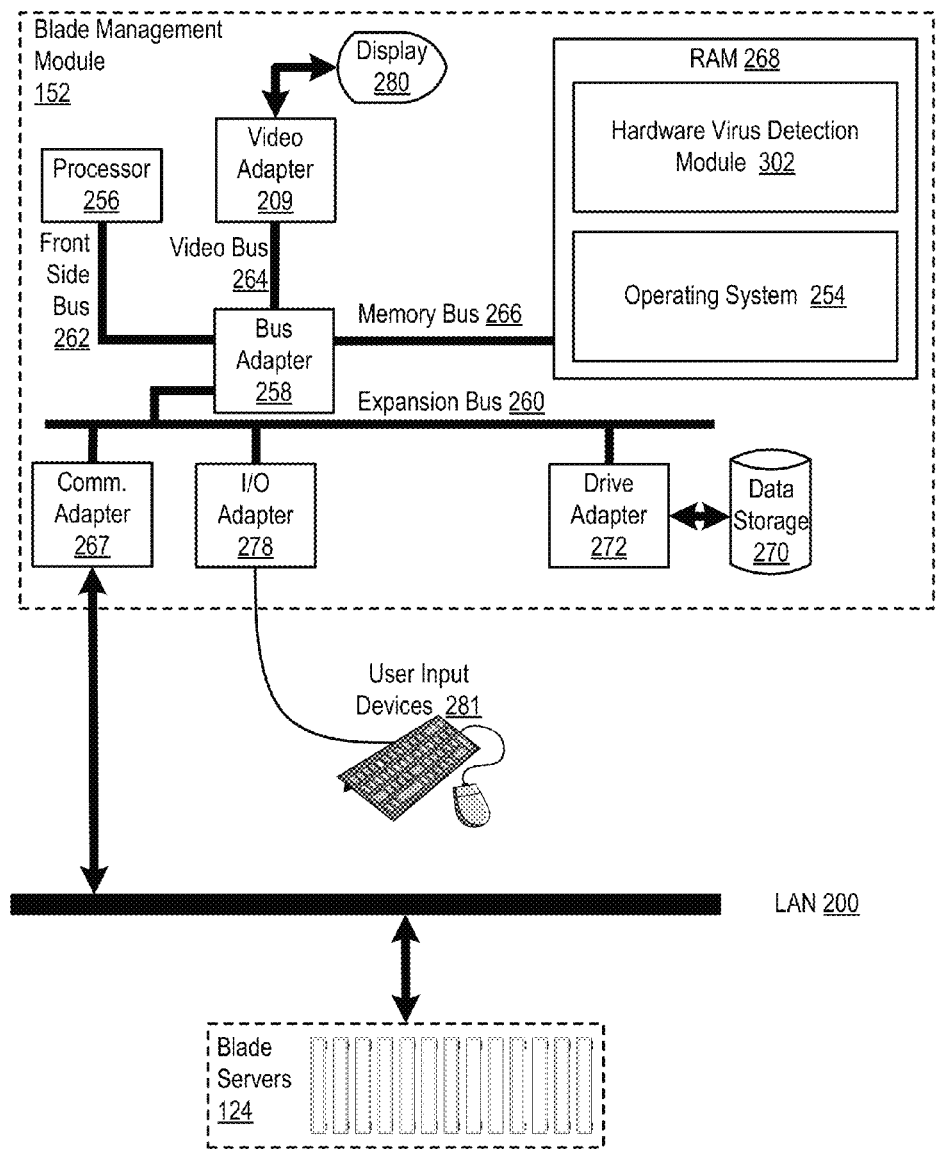
FIG. 2 sets forth a block diagram of automated computing machinery comprising an example blade management module useful in preventing propagation of hardware viruses in a computing system according to embodiments of the present invention.

FIG. 2 sets forth a block diagram of automated computing machinery comprising an example blade management module (152) useful in preventing propagation of hardware viruses in a computing system according to embodiments of the present invention. The blade management module (152) of FIG. 2 includes at least one computer processor (256) or 'CPU' as well as random access memory (268) ('RAM') which is connected through a high speed memory bus (266) and bus adapter (258) to processor (256) and to other components of the blade management module (152).

Stored in RAM (268) is a hardware virus detection module (302), a module of computer program instructions for preventing propagation of hardware viruses in a computing system. Also stored in RAM (268) is an operating system (254). Operating systems useful preventing propagation of hardware viruses in a computing system according to embodiments of the present invention include UNIX™, Linux™, Microsoft XP™, AIX™, IBM's i5/OS™, and others as will occur to those of skill in the art. The operating system (254) and the hardware virus protection module (302) in the example of FIG. 2 are shown in RAM (268), but many components of such software typically are stored in non-volatile memory also, such as, for example, on a disk drive (270).

The blade management module (152) of FIG. 2 includes disk drive adapter (272) coupled through expansion bus (260) and bus adapter (258) to processor (256) and other components of the blade management module (152). Disk drive adapter (272) connects non-volatile data storage to the blade management module (152) in the form of disk drive (270). Disk drive adapters useful in computers for [preamble] according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example blade management module (152) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example blade management module (152) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The example blade management module (152) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for preventing propagation of hardware viruses in a computing system according to embodiments of the present invention include modems for wired dial-up communications, Ethernet (IEEE 802.3) adapters for wired data communications network communications, and 802.11 adapters for wireless data communications network communications.

Figure 3:
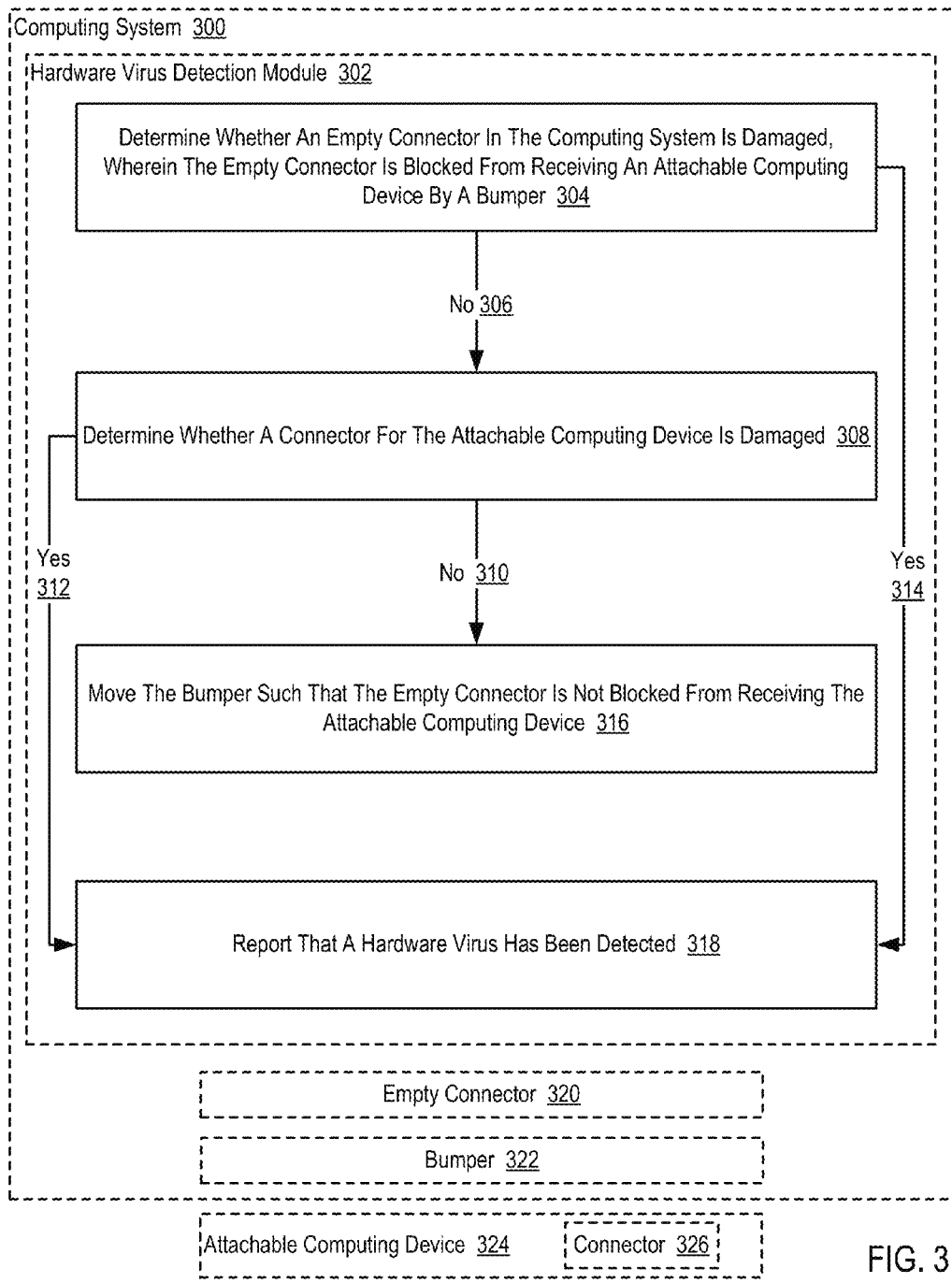
FIG. 3 sets forth a flow chart illustrating an example method for preventing propagation of hardware viruses in a computing system according to embodiments of the present invention.

For further explanation, FIG. 3 sets forth a flow chart illustrating an example method for preventing propagation of hardware viruses in a computing system according to embodiments of the present invention. In the example method of FIG. 3, the computing system (300) may be embodied as a blade center that includes a blade chassis and a plurality of blade servers installed in the blade chassis.

The computing system of FIG. 3 also includes a hardware virus detection module (302). In the example method of FIG. 3, the hardware virus detection module (302) may be embodied as automated computing machinery that includes computer program instructions executing on computer hardware. The hardware virus detection module (302) may include computer program instructions that are stored in read-only memory attached to a midplane of the blade center, as computer program instructions that are included as part of a management module that manages the operations performed in the blade center, and in other ways as will occur to those of skill in the art.

The example method of FIG. 3 includes determining (304), by the hardware virus detection module (302), whether an empty connector (320) in the computing system (300) is damaged. In the example method of FIG. 3, the empty connector (320) in the computing system (300) may be embodied, for example, as a connector in a slot configured to receive a blade server. The empty connector (320) may include a male jack, a female jack, or may be embodied in another form factor of connector configured to connect an attachable computing device such as a blade server to the computing system (300).

In the example method of FIG. 3, the empty connector (320) is blocked from receiving an attachable computing device (324) by a bumper (322). The bumper (322) of FIG. 3 may be embodied as a physical obstacle that prevents the empty connector (320) from receiving an attachable computing device (324). For example, the bumper (322) of FIG. 3 may be embodied as a retractable pin or plate that prevents the insertion of a blade server into a slot in a blade chassis for receiving a blade server. When a particular connector in the computing system (300) is empty, the retractable pin or plate may be in an un-retracted state such an attachable computing device (324) cannot be inserted into the empty connector (320) until the integrity of the empty connector (320) and the attachable computing device (324) has been verified.

In the example method of FIG. 3, determining (304) whether an empty connector (320) in the computing system (300) is damaged may be carried out, for example, through the use of an image sensor that is controlled by the hardware virus detection module (302). The hardware virus detection module (302) may be configured to control the operation of the image sensor to capture an image of the empty connector (320) and compare the captured image of the empty connector (320) to an image of an undamaged connector of the same type. By comparing the captured image of the empty connector (320) to an image of an undamaged connector of the same type, the hardware virus detection module (302) can identify missing pins on the empty connector (320), bent pins on the empty connector (320), and other forms of damage to the empty connector (320) as will occur to those of skill in the art.

The example method of FIG. 3 also includes determining (308), by the hardware virus detection module (302), whether a connector (326) for the attachable computing device (324) is damaged. In the example method of FIG. 3, determining (308) whether a connector (326) for the attachable computing device (324) is damaged may be carried out, for example, upon an attempt to insert the attachable computing device (324) into the empty connector (320).

Consider an example in which the attachable computing device (324) is a blade server and the empty connector (320) is a connector in a slot of a blade chassis for receiving a blade server. In such an example, a system administrator will not be able to insert the blade server into the slot of the blade chassis because physical access to the empty connector (320) is blocked by the bumper (322). Bringing the blade server within a predetermined distance of the bumper (322), however, may cause a scan of the attachable computing device (324) to be initiated. For example, the hardware virus detection module (302) may be configured to control the operation of the image sensor to capture an image of the connector (326) of the attachable computing device (324) and to compare the captured image of the connector (326) of the attachable computing device (324) to an image of an undamaged connector of the same type. By comparing the captured image of the connector (326) of the attachable computing device (324) to an image of an undamaged connector of the same type, the hardware virus detection module (302) can identify missing pins on the connector (326) of the attachable computing device (324), bent pins on the connector (326) of the attachable computing device (324), and other forms of damage to the connector (326) of the attachable computing device (324) as will occur to those of skill in the art.

Although the examples described above include the use of image sensing technologies to identify damage to connectors, readers will appreciate that damage to connectors may be detected in other ways. For example, damage to connectors may be detected through the use of an image sensor and a light to compare the reflection profile of a connector to a template. Other contemplated techniques include the use of an electrical source to identify an electrical short that results from damage to a connector, the use of mechanical techniques to compare the mechanical properties of a connector a profile, and so on.

The example method of FIG. 3 also includes moving (316) the bumper (322) such that the empty connector (320) is not blocked from receiving the attachable computing device (324). Consider the example in which the bumper (322) is retractable. In such an example, moving (316) the bumper (322) may be carried out by retracting the bumper into the server chassis, such that the empty connector (320) is not blocked from receiving the attachable computing device (324). In such an example, the hardware virus detection module (302) can include computer program instructions that, when executed, control the operation of the bumper (322). In the example method of FIG. 3, moving (316) the bumper (322) such that the empty connector (320) is not blocked from receiving the attachable computing device (324) is carried out in response to determining that the empty connector (320) is not (306) damaged and also determining that the connector (326) for the attachable computing device (324) is not (310) damaged.

The example method of FIG. 3 also includes reporting (318), by the hardware virus detection module (302), that a hardware virus has been detected. Reporting (318) that a hardware virus has been detected may be carried out, for example, by the hardware virus detection module (302) sending a message to a system administrator identifying the nature of the hardware virus, by recording information in a virus log identifying the nature of the hardware virus, by illuminating an indicator light on the computing system (300) identifying the nature of the hardware virus, and so on. In the example method of FIG. 3, reporting (318), by the hardware virus detection module (302), that a hardware virus has been detected may be carried out in response to affirmatively (314) determining that the empty connector (320) is damaged. Alternatively, reporting (318) that a hardware virus has been detected may alternatively be carried out in response to affirmatively (312) determining that the connector (326) for the attachable computing (324) device is damaged. In the example method of FIG. 3, reporting (318) that a hardware virus has been detected may also include identifying information regarding the nature of the hardware virus. For example, reporting (318) that a hardware virus has been detected may include identifying a particular pin that has been damaged and even identifying the nature of the damage (e.g., pin 15 is bent, pin 15 is missing, female connector 15 has a pin stuck inside of it, and so on).

Figure 4:
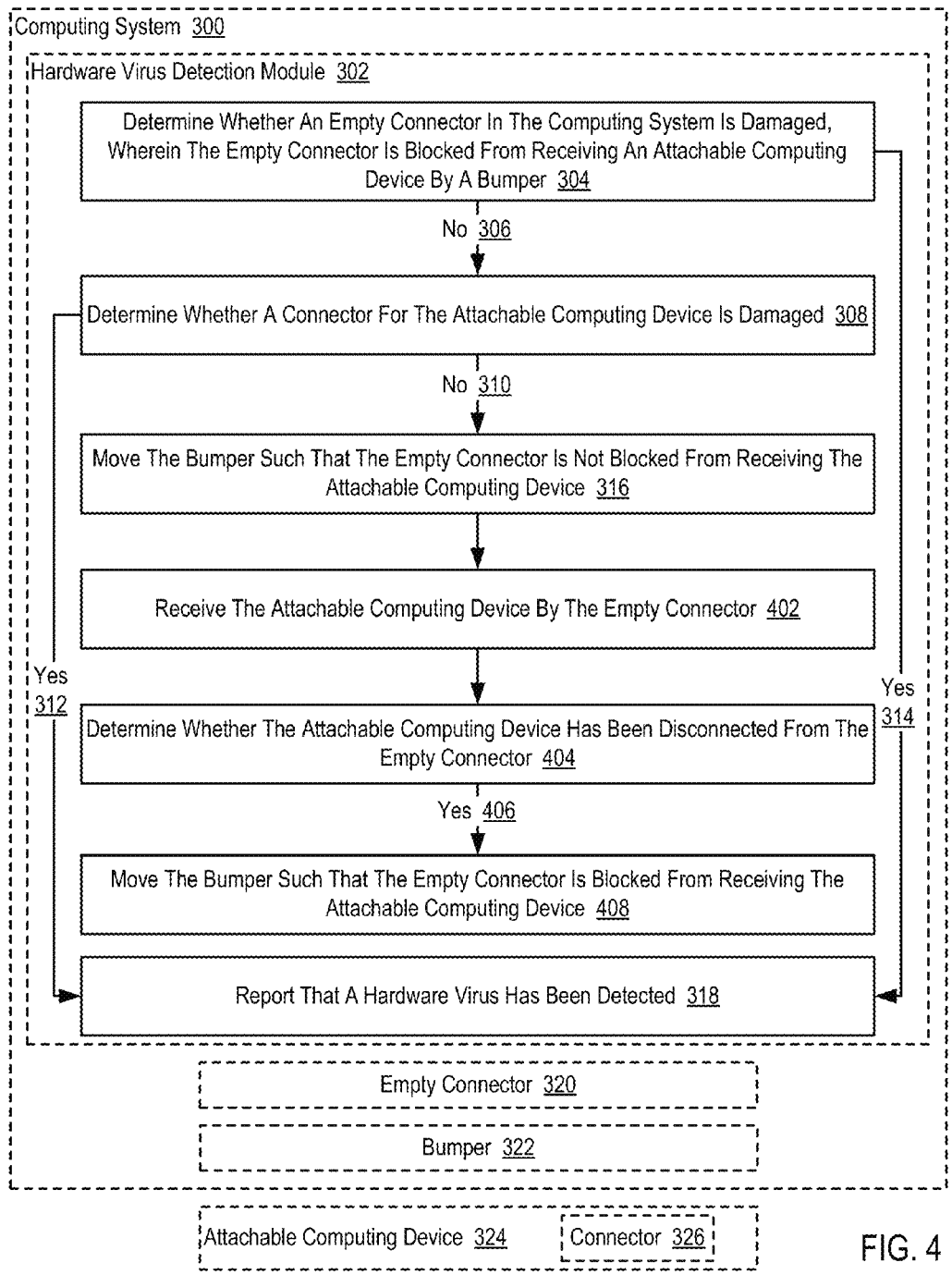
FIG. 4 sets forth a flow chart illustrating a further example method for preventing propagation of hardware viruses in a computing system according to embodiments of the present invention.

For further explanation, FIG. 4 sets forth a flow chart illustrating a further example method for preventing propagation of hardware viruses in a computing system according to embodiments of the present invention. The example method of FIG. 4 is similar to the example method of FIG. 3 as it also includes determining (304) whether an empty connector (320) in the computing system (300) is damaged, determining (308) whether a connector (326) for the attachable computing device (324) is damaged, and moving (316) the bumper (322) such that the empty connector (320) is not blocked from receiving the attachable computing device (324).

The example method of FIG. 4 also includes receiving (402) the attachable computing device (324) by the empty connector (320). In the example method of FIG. 4, receiving (402) the attachable computing device (324) by the empty connector (320) may be carried out by creating an electrical connection between the empty connector (320) and the connector (326) of the attachable computing device (324). Consider the example described above in which the attachable computing device (324) is a blade server and the empty connector (320) is a connector in a slot of a blade chassis for receiving a blade server. In such an example, receiving (402) the attachable computing device (324) by the empty connector (320) may be carried out by a system administrator inserting the blade server into the slot of the blade chassis, such that a connector of the blade server becomes coupled with a connector of the blade chassis.

The example method of FIG. 4 also includes determining (404), by the hardware virus detection module (302), whether the attachable computing device (324) has been disconnected from the empty connector (320). In the example method of FIG. 4, determining (404) whether the attachable computing device (324) has been disconnected from the empty connector (320) may be carried out, for example, by determining that the electrical connection between the empty connector (320) and the connector (326) of the attachable computing device (324) has been broken. In such an example, the attachable computing device (324) may be disconnected from the empty connector (320) by a system administrator removing the attachable computing device (324) from the computing system (300). Consider the example described above in which the attachable computing device (324) is a blade server and the empty connector (320) is a connector in a slot of a blade chassis for receiving a blade server. In such an example, the attachable computing device (324) may be disconnected from the empty connector (320) by a system administrator removing the blade server from the slot of the blade chassis.

The example method of FIG. 4 also includes moving (408) the bumper (322) such that the empty connector (320) is blocked from receiving the attachable computing device (324). The bumper (322) of FIG. 4 may be embodied as a physical obstacle that prevents the empty connector (320) from receiving an attachable computing device (324). For example, the bumper (322) of FIG. 4 may be embodied as a retractable pin or plate that prevents the insertion of a blade server into a slot in a blade chassis for receiving a blade server. In the example method of FIG. 4, moving (408) the bumper (322) such that the empty connector (320) is blocked from receiving the attachable computing device (324) may therefore be carried out by extending or otherwise un-retracting the bumper (322). In such an example, moving (408) the bumper (322) such that the empty connector (320) is blocked from receiving the attachable computing device (324) is carried out in response to affirmatively (406) determining that the attachable computing device (324) has been disconnected from the empty connector (320).

Figure 5:
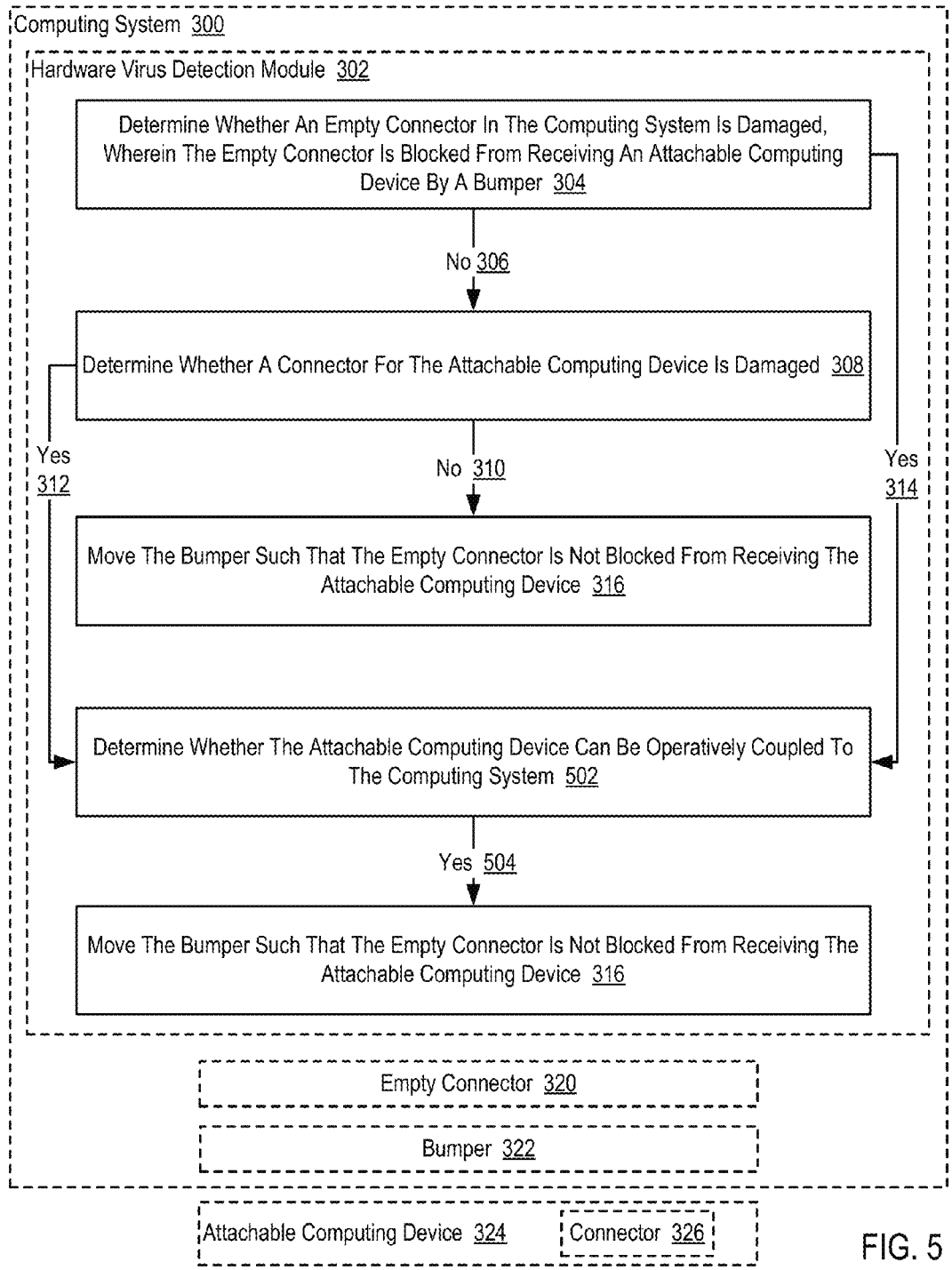
FIG. 5 sets forth a flow chart illustrating a further example method for preventing propagation of hardware viruses in a computing system according to embodiments of the present invention.

For further explanation, FIG. 5 sets forth a flow chart illustrating a further example method for preventing propagation of hardware viruses in a computing system according to embodiments of the present invention. The example method of FIG. 5 is similar to the example method of FIG. 3 as it also includes determining (304) whether an empty connector (320) in the computing system (300) is damaged, determining (308) whether a connector (326) for the attachable computing device (324) is damaged, and moving (316) the bumper (322) such that the empty connector (320) is not blocked from receiving the attachable computing device (324).

The example method of FIG. 5 also includes determining (502) whether the attachable computing device (324) can be operatively coupled to the computing system (300). In the example method of FIG. 5, determining (502) whether the attachable computing device (324) can be operatively coupled to the computing system (300) is carried out in response to affirmatively (314) determining that the empty connector (320) is damaged or affirmatively (312) determining that the connector (326) for the attachable computing device (324) is damaged. In the example method of FIG. 5, the attachable computing device (324) can be operatively coupled to the computing system (300) in spite of the damage, for example, when the damaged components are not used when coupling the attachable computing device (324) to the computing system (300).

Consider the example described above in which the attachable computing device (324) is a blade server and the empty connector (320) is a connector in a slot of a blade chassis for receiving a blade server. In such an example, the empty connector (320) may be determined to be damaged as the connector to receive an option card is damaged. In such an example, however, if the blade server does not include an option card, the damage to the empty connector (320) may not prohibit the blade server from being operatively connected to the blade chassis via the empty connector (320). As such, the blade server could be inserted into the slot of the blade chassis and the blade server could operate normally in spite of the damage to the empty connector (320).

In the example method of FIG. 5, determining (502) whether the attachable computing device (324) can be operatively coupled to the computing system (300) may be carried out, for example, by identifying the particular portion of the empty connector (320) that is damaged and inspecting an image of the connector (326) of the attachable computing device (324) to determine whether the attachable computing device (324) will need to utilize the particular portion of the empty connector (320) that is damaged. Alternatively, determining (502) whether the attachable computing device (324) can be operatively coupled to the computing system (300) may be carried out by sending information to a system administrator identifying the nature of the damage and receiving user-input from the system administrator confirming that the attachable computing device (324) can be operatively coupled to the computing system (300) in spite of the damage. In response to affirmatively (504) determining that the attachable computing device (324) can be operatively coupled to the computing system (300), the hardware virus detection module (302) can move (316) the bumper (322) such that the empty connector (320) is not blocked from receiving the attachable computing device (324) as described above with reference to FIG. 3 and FIG. 4.

Although the examples described above make specific reference to a blade server that is inserted into a blade chassis, readers will appreciate that these examples are only given for illustrative purposes and do not represent limitations of embodiments of the present invention. Embodiments of the present invention are contemplated in which the claimed computing system can take many forms such as a personal computer, mobile communications device, tablet computer, non-blade servers, or other computing device that includes a connector for coupling the computing system to another physical device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   determining, by a hardware virus detection device, whether an empty connector in a computing system is damaged wherein the empty connector is blocked from receiving an attachable computing device by a bumper;
   determining, by a hardware virus detection device, whether a connector for the attachable computing device is damaged;
   responsive to determining that the empty connector is not damaged and that the connector for the attachable computing device is not damaged, moving the bumper such that the empty connector is not blocked from receiving the attachable computing device;
   responsive to determining that the empty connector is damaged or that the connector for the attachable computing device is damaged, determining whether the attachable computing device can be operatively coupled to the computing system; and
   responsive to the determining that the attachable computing device can be operatively coupled to the computing system, moving the bumper such that the empty connector is not blocked from receiving the attachable computing device.

2. The method of claim 1 further comprising, responsive to determining that the empty connector is damaged, reporting that a hardware virus has been detected.

3. The method of claim 1 further comprising, responsive to determining that the connector for the attachable computing device is damaged, reporting that a hardware virus has been detected.

4. The method of claim 1 wherein the computing system is a blade chassis and the empty connector is included in a slot configured to receive a blade server.

5. The method of claim 1 wherein the attachable computing device is a blade server.

6. The method of claim 1 further comprising:
   receiving the attachable computing device by the empty connector;
   determining whether the attachable computing device has been disconnected from the empty connector; and
   responsive to determining that the attachable computing device has been disconnected from the empty connector, moving the bumper such that the empty connector is blocked from receiving the attachable computing device.

7. An apparatus comprising a computer processor and a computer memory operatively coupled to the computer processor, the computer memory having disposed within it computer program instructions that, when executed by the computer processor, cause the apparatus to carry out the steps of:

determining, by a hardware virus detection device, whether an empty connector in a computing system is damaged-wherein the empty connector is blocked from receiving an attachable computing device by a bumper;

determining, by a hardware virus detection device, whether a connector for the attachable computing device is damaged;

responsive to determining that the empty connector is not damaged and that the connector for the attachable computing device is not damaged, moving the bumper such that the empty connector is not blocked from receiving the attachable computing device;

responsive to determining that the empty connector is damaged or that the connector for the attachable computing device is damaged, determining whether the attachable computing device can be operatively coupled to the computing system; and responsive to the determining that the attachable computing device can be operatively coupled to the computing system, moving the bumper such that the empty connector is not blocked from receiving the attachable computing device.

8. The apparatus of claim 7 further comprising computer program instructions that, when executed by the computer processor, cause the apparatus to carry out the step of, responsive to determining that the empty connector is damaged, reporting that a hardware virus has been detected.

9. The apparatus of claim 7 further comprising computer program instructions that, when executed by the computer processor, cause the apparatus to carry out the step of, responsive to determining that the connector for the attachable computing device is damaged, reporting that a hardware virus has been detected.

10. The apparatus of claim 7 wherein the computing system is a blade chassis and the empty connector is included in a slot configured to receive a blade server.

11. The apparatus of claim 7 wherein the attachable computing device is a blade server.

12. The apparatus of claim 7 further comprising computer program instructions that, when executed by the computer processor, cause the apparatus to carry out the steps of:

receiving the attachable computing device by the empty connector;

determining whether the attachable computing device has been disconnected from the empty connector; and responsive to determining that the attachable computing device has been disconnected from the empty connector, moving the bumper such that the empty connector is blocked from receiving the attachable computing device.

13. A computer program product comprising a non-transitory computer readable medium, the computer readable medium comprising computer program instructions that, when executed, cause a computer to carry out the steps of:

determining, by a hardware virus detection device, whether an empty connector in a computing system is damaged wherein the empty connector is blocked from receiving an attachable computing device by a bumper;

determining, by a hardware virus detection device, whether a connector for the attachable computing device is damaged;

responsive to determining that the empty connector is not damaged and that the connector for the attachable computing device is not damaged, moving the bumper such that the empty connector is not blocked from receiving the attachable computing device;

responsive to determining that the empty connector is damaged or that the connector for the attachable computing device is damaged, determining whether the attachable computing device can be operatively coupled to the computing system; and responsive to the determining that the attachable computing device can be operatively coupled to the computing system, moving the bumper such that the empty connector is not blocked from receiving the attachable computing device.

14. The computer program product of claim 13 further comprising computer program instructions that, when executed, cause the computer to carry out the step of, responsive to determining that the empty connector is damaged, reporting that a hardware virus has been detected.

15. The computer program product of claim 13 further comprising computer program instructions that, when executed, cause the computer to carry out the step of, responsive to determining that the connector for the attachable computing device is damaged, reporting that a hardware virus has been detected.

16. The computer program product of claim 13 wherein the computing system is a blade chassis and the empty connector is included in a slot configured to receive a blade server.

17. The computer program product of claim 13 wherein the attachable computing device is a blade server.

18. The computer program product of claim 13 further comprising computer program instructions that, when executed, cause the computer to carry out the step of:

receiving the attachable computing device by the empty connector;

determining whether the attachable computing device has been disconnected from the empty connector; and responsive to determining that the attachable computing device has been disconnected from the empty connector, moving the bumper such that the empty connector is blocked from receiving the attachable computing device.

* * * * *